US005618568A

United States Patent [19]
Krupa et al.

[11] Patent Number: 5,618,568
[45] Date of Patent: Apr. 8, 1997

[54] DUAL-CHAMBER VACUUM BOX

[75] Inventors: Vernon J. Krupa; Jeffrey M. Seckora, both of Chippewa Falls; Brian M. Pitsch, Jim Falls, all of Wis.

[73] Assignee: Extrusion Dies, Inc., Chippewa Falls, Wis.

[21] Appl. No.: 382,252

[22] Filed: Feb. 1, 1995

[51] Int. Cl.⁶ .................................................. B29C 39/42
[52] U.S. Cl. ........................ 425/224; 264/101; 264/556; 425/388
[58] Field of Search ..................... 425/75, 224, 388, 425/115, 72.1, 326.1; 264/556, 101; 118/410, 320, 322

[56] References Cited

U.S. PATENT DOCUMENTS

| | | | |
|---|---|---|---|
| 2,681,294 | 6/1954 | Beguin | 117/34 |
| 2,688,155 | 9/1954 | Nadeau et al. | 264/212 |
| 2,714,745 | 8/1955 | Kenyon | 425/75 |
| 3,347,962 | 10/1967 | Dieck et al. | 264/556 |
| 3,520,964 | 7/1970 | Metz, Jr. | 264/216 X |
| 3,638,604 | 2/1972 | Herzhoff et al. | 118/410 X |
| 3,645,773 | 2/1972 | Herzhoff et al. | 117/34 |
| 3,663,292 | 5/1972 | Herzhoff et al. | 117/34 |
| 3,690,917 | 9/1972 | Hershoff et al. | 117/34 |
| 3,735,729 | 5/1973 | Bird | 118/407 X |
| 3,749,053 | 7/1973 | Timson | 118/412 X |
| 4,265,941 | 5/1981 | Saito | 427/296 |
| 4,310,295 | 1/1982 | Heyer | 425/224 |
| 4,335,672 | 6/1982 | Krussig | 118/410 X |
| 4,401,424 | 8/1983 | De Zen | 425/388 |
| 4,428,896 | 1/1984 | Stevenson | 264/40.1 |
| 4,501,712 | 2/1985 | Heyer | 264/101 |
| 4,545,321 | 10/1985 | Bassa | 118/410 X |
| 4,668,463 | 5/1987 | Cancio et al. | 264/556 |
| 4,783,304 | 11/1988 | Heyer | 264/556 |
| 4,808,357 | 2/1989 | Bourcier et al. | 264/151 |
| 4,842,900 | 6/1989 | Miyamoto | 118/410 X |
| 5,136,966 | 8/1992 | Miyagawa et al. | 118/410 X |
| 5,147,595 | 9/1992 | Sanderford | 264/555 |
| 5,154,951 | 10/1992 | Finnicum et al. | 118/410 X |

FOREIGN PATENT DOCUMENTS 54-150477 11/1979 Japan .

OTHER PUBLICATIONS

"Tools for Optimizing the Cast Film Process," James L. Flanagan, World Conference on Polyethylene, London, May, 1992.
"Stabilizing the film is important," *Modern Plastics*, Feb., 1993, p. 57.
EDI drawing No. 2SP1032, Dec. 3, 1993.

*Primary Examiner*—Richard L. Chiesa
*Attorney, Agent, or Firm*—Marshall, O'Toole, Gerstein, Murray & Borun

[57] ABSTRACT

A dual-chamber vacuum box for pinning a thermoplastic web to a cooling roll includes a primary vacuum chamber connected to a first vacuum source. The primary vacuum chamber has a first side located proximate a surface of the web at a line of contact between the web and the cooling roll and a second side opposite the first side. A secondary vacuum is chamber connected to a second vacuum source and is positioned adjacent the second side of the primary vacuum chamber. Apparatus is disposed between the primary and secondary vacuum chambers for creating a pressure variation along the line of contact between the web and the cooling roll.

23 Claims, 8 Drawing Sheets

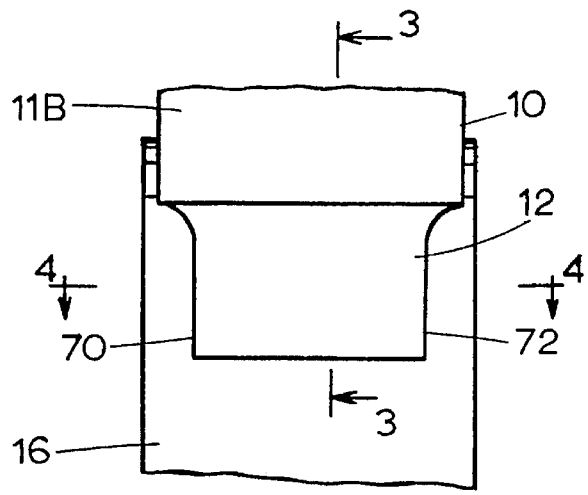
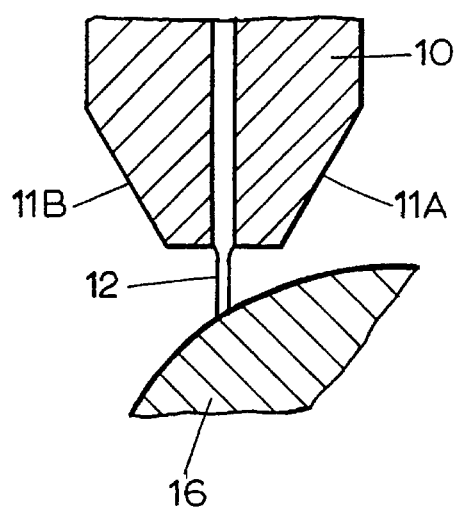
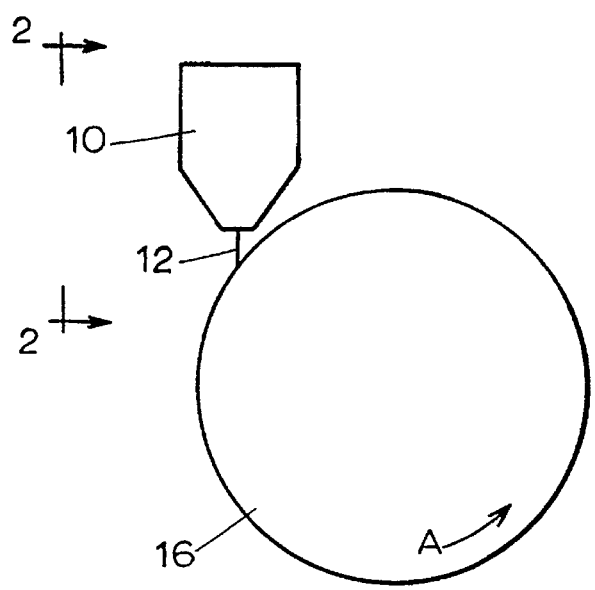
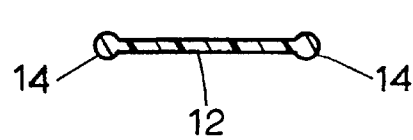

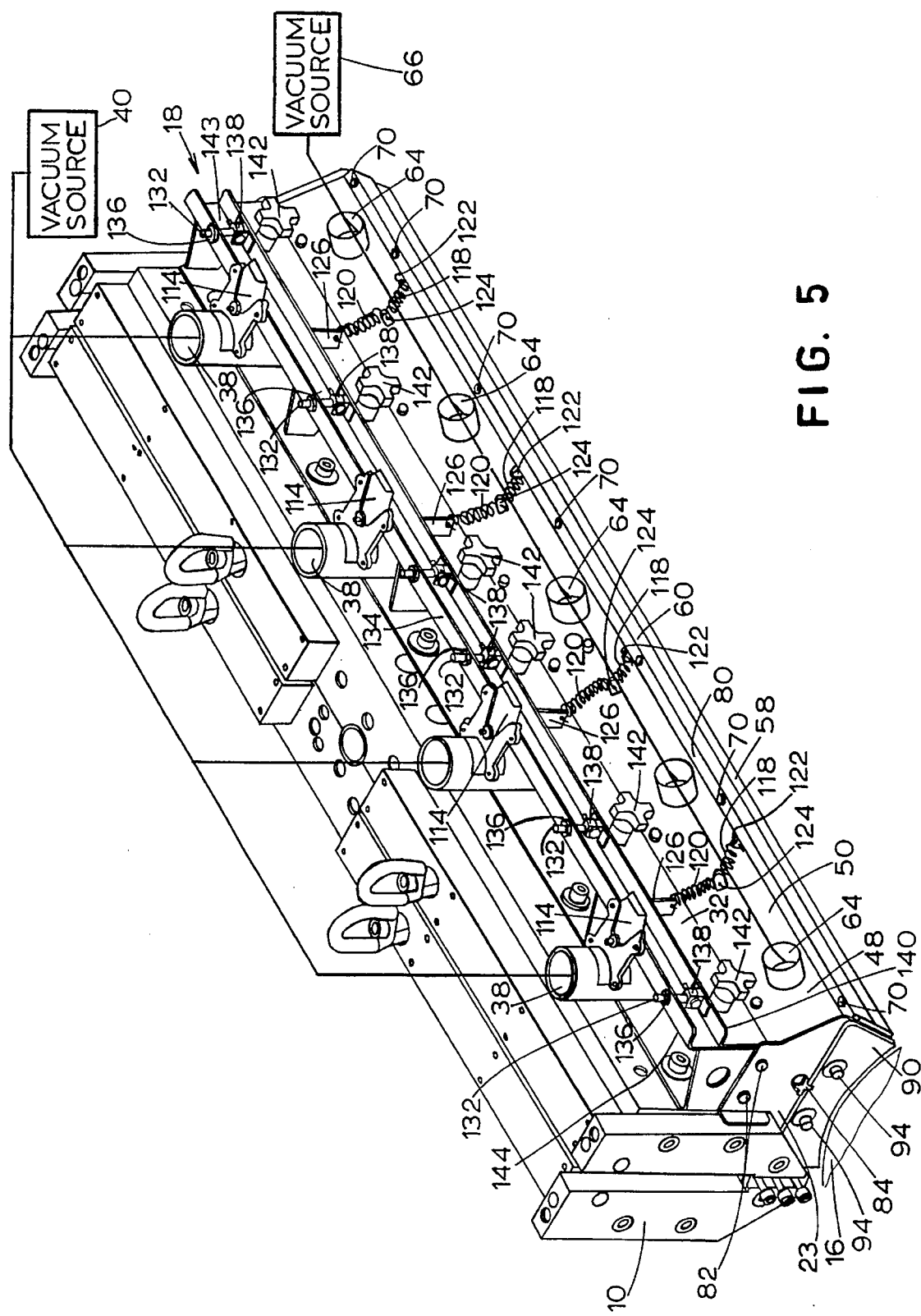

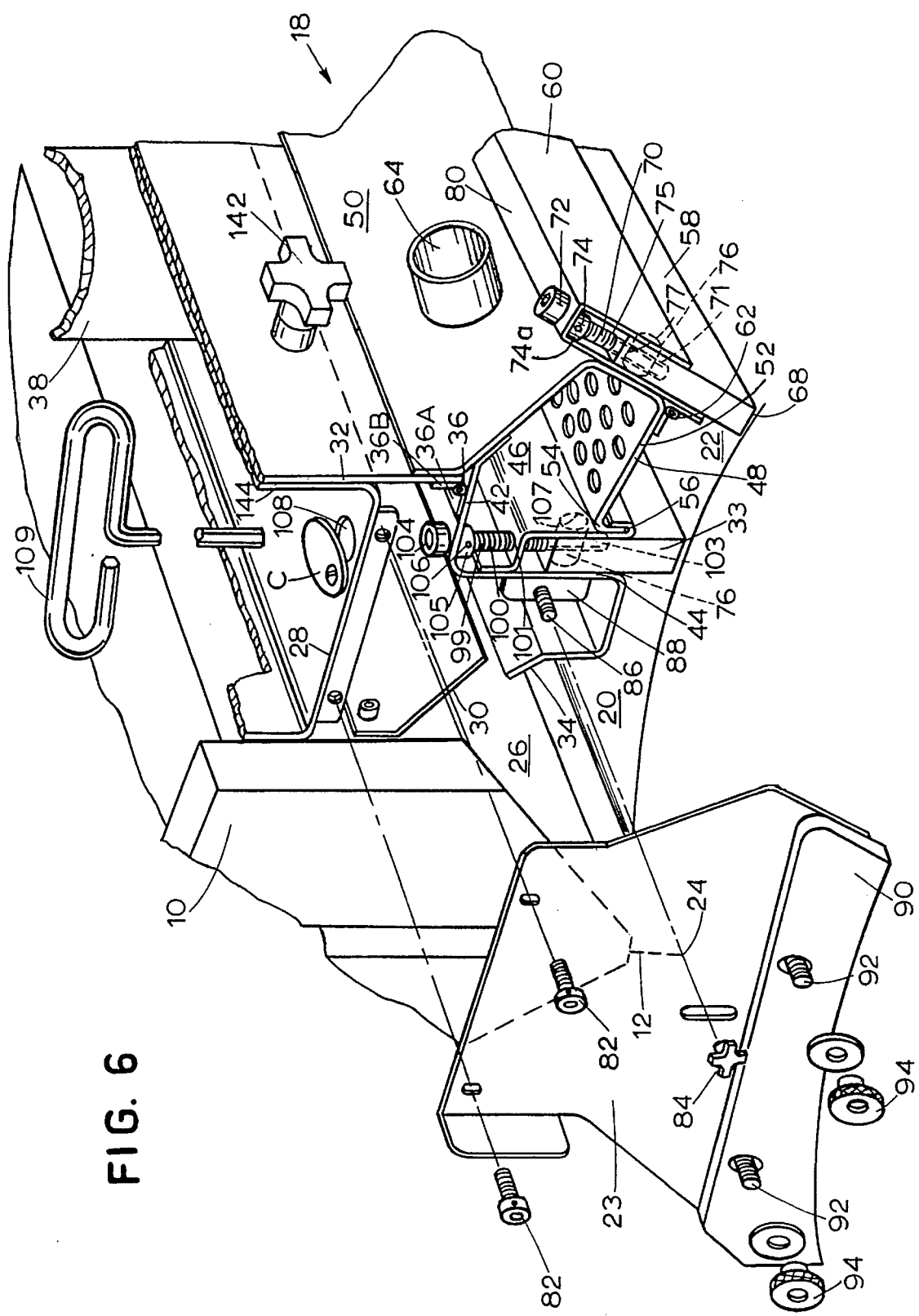

DUAL-CHAMBER VACUUM BOX

TECHNICAL FIELD

The present invention relates generally to devices used to pin thermoplastic webs in a film production process, and more particularly to a dual-chamber vacuum box for pinning a thermoplastic extruded web to a cooling roll.

BACKGROUND ART

Thermoplastic sheets or webs of material are often formed by extruding heated thermoplastic ("melt") through a die and depositing same as a film on a cooling or casting roll so as to form a sheet of a desired thickness.

A problem associated with the extrusion process is web stability. The film normally exits the die many times thicker than its finished form and must be stretched while in the molten state. If a film is stretched past a certain limit it will no longer stretch uniformly, resulting generally in a thick/thin pattern near the ends of the web. Similarly, a temperature gradient within the melt exiting the die can result in a cyclic thick/thin pattern and unstable edges as the hotter melt portion of the exiting web will stretch more than the cooler portion.

The stretching of the melt thins the melt curtain in one direction but also contributes to "neck-in" wherein the web narrows in the transverse direction perpendicular to the stretching direction, this condition can create an edge bead which interferes with uniform roll contact and uniform rate of cooling. Also, this condition may be accompanied by edge instability wherein strains are introduced that may contribute to quality problems in downstream process steps.

In addition, the greater the melt necks in, the greater the amount of waste edge material which must be trimmed. This results in less material to sell.

Finally, during production, the rapidly moving cooling roll carries entrained air on the surface thereof which is trapped between the melt and roll and which prevents intimate contact between the two, allows continued stretching of the web as it passes around the roll and adversely affects surface finish.

It has been found that if the melt is placed in intimate contact with the roll surface neck-in and other adverse effects are reduced. One method of attempting to provide intimate contact has involved the use of an air knife which impinges a high velocity curtain of air against the web thereby pinning same against the roll surface. Often used simultaneously with the air knife are air edge pinners which use a narrow focused jet of air to pin and stabilize the edge bead just prior to the air knife. Forced air pinning is, however, of limited use during high speed operation due to film distortions created by air being trapped under the molten web as the web is laid onto the cooling roll.

In addition, electrostatic pinners have been employed to attempt to force the web into intimate roll contact. These pinners have also been limited to slower operation, as air bubbles can be trapped under the web at high speeds.

Still further, vacuum boxes have been used to attempt to provide intimate web/roll contact. This technology employs an evacuated chamber placed immediately upstream of the die lips. The air carried by the roll surface is removed and a slight negative pressure is created on one side of the melt. Atmospheric pressure acting on the other side of the melt then forces the molten plastic into contact with the roll surface. Though this technique has been useful, it has not been as efficient or effective as required.

SUMMARY OF THE INVENTION

In accordance with one aspect of the present invention, a dual-chamber vacuum box for pinning a thermoplastic web to a cooling roll includes a primary vacuum chamber connected to a first vacuum source. The primary vacuum chamber includes a first side located proximate the surface of the web at the line of contact between the web and the cooling roll and a second side opposite the first side. A secondary vacuum chamber is connected to a second vacuum source and is positioned adjacent the second side of the primary vacuum chamber. The dual-chamber vacuum box further includes means disposed between the primary and secondary vacuum chambers for creating a pressure variation along the line of contact between the web and the cooling roll.

In accordance with a preferred embodiment, the creating means includes a partition, such as a deformable blade, which may be hingedly or fixedly connected between the primary and the secondary vacuum chambers and which has a surface adjacent the cooling roll. The partition permits varying interaction between the primary and secondary chambers.

In accordance with an alternative embodiment, the partition includes end portions disposed on opposite sides of a center portion and the surface of the partition is closer to the cooling roll at the center portion then at the end portions.

Also preferably, means are connected to the partition for adjusting the distance between the partition surface and the cooling roll. The adjusting means may include a plurality of threaded bores disposed in the partition and a plurality of screws threaded into the bores.

If desired, an external blade may be hingedly or fixedly carried by the secondary chamber.

These and other aspects, features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 1 is a schematic elevational view of a die forming a web of thermoplastic material on a cooling roll;

FIG. 2 is an enlarged, fragmentary, side elevational view of the die and cooling roll of FIG. 1 taken generally along the view lines 2—2 of FIG. 1;

FIGS. 3 and 4 are sectional views through the die and melt stream taken generally along the lines 3—3 and 4—4, respectively, of FIG. 2;

FIG. 5 is an isometric view of a die in conjunction with the dual-chamber vacuum box of the present invention;

FIG. 6 is an enlarged, fragmentary, isometric view of the dual-chamber vacuum box of FIG. 5 with the end seal plate thereof removed to allow the interior of the box to be seen;

FIG. 11 comprises an isometric view of the internal vacuum blade of FIG. 10.

DESCRIPTION OF THE PREFERRED EMBODIMENTS

Figure 7:
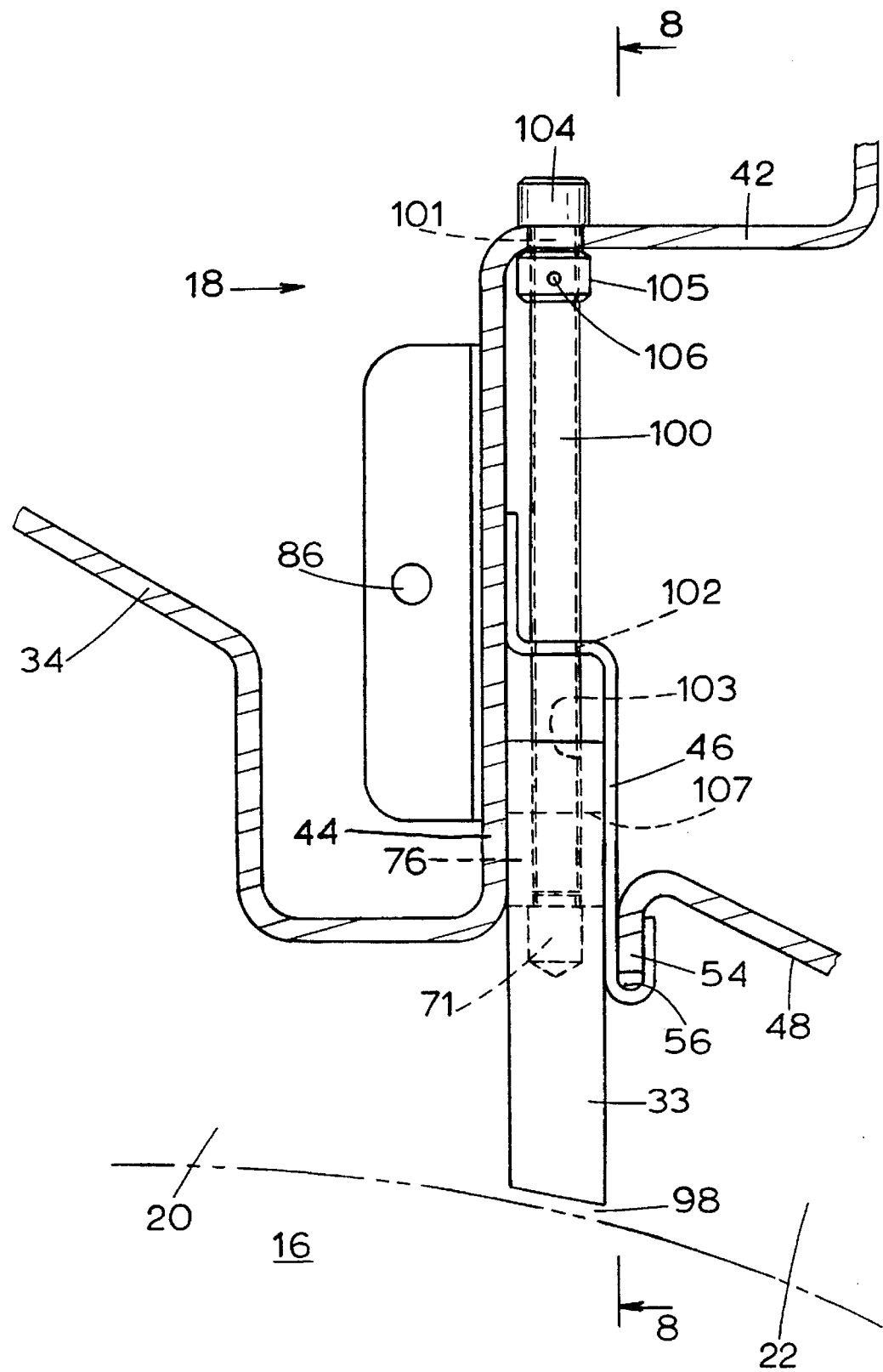
FIG. 7 is an enlarged, fragmentary, side elevational view of a portion of the dual-chamber vacuum box of FIG. 6 illustrating an internal vacuum blade disposed between primary and secondary vacuum chambers in greater detail.

As seen schematically in FIGS. 1–3, an extrusion die 10 includes upstream and downstream lips 11A, 11B from which a thermoplastic film or web 12 is extruded. The web 12 is deposited onto a cooling or casting roll 16 which rotates in the direction of the arrow A and the web 12 is stretched from the end of the die body 10. As it is stretched the web 12 narrows in both thickness and width. This narrowing is referred to as "neck-in." Referring also to FIG. 4, as the web 12 necks in, edge beads 14 thicker than the remainder of the web 12 are formed. The present invention, as described below, stabilizes the edges of the web 12 while minimizing and controlling neck-in and edge beading 14 and the problems associated therewith.

With reference now to FIGS. 5–8, a dual-chamber vacuum box 18 according to the present invention is placed immediately upstream of the die 10. The vacuum box 18, the die 10 and the roll 16 are substantially the same width.

The dual-chamber vacuum box 18 includes a primary vacuum chamber 20, a secondary vacuum chamber 22 and a pair of end seal plates 23 (only one of which is visible in the FIGS.) enclosing the two chambers 20, 22 at the ends thereof.

As seen best in FIGS. 5 and 6, the primary chamber 20 is located adjacent to the die 10 and proximate the surface of the thermoplastic film or web 12 at a line of contact 24 between the film 12 and the roll 16. The primary vacuum chamber 20 is bounded by or includes therein an outer wall 26 of the die 10, a top wall 28 connected to the outer wall 26, a first baffle 30 attached to the outer wall 26, a side wall 32 removably connected to the top wall 28 by bolts as noted in greater detail hereinafter, a second baffle 34 connected by a first hinge 36 to the side wall 32 and pivotable with respect thereto and a one-piece internal vacuum blade 33 described in greater detail below. A plurality of primary exhaust ports 38 connect the primary chamber 20 to a primary vacuum source 40.

The primary vacuum chamber 20 is responsible for controlling the vacuum pressure immediately adjacent the web 12. As best seen in FIG. 3, the primary vacuum chamber 20 preferably develops a substantially static or quiescent low pressure zone adjacent the web 12 so that the web 12 drops straight onto the roll 16. Also, by applying the proper vacuum level, the web 12 is prevented from being dragged by the roll 16 over the downstream lip 11B of the die body 10 or from being dragged by a too-high vacuum level over the upstream lip 11A of the die body 10. Either condition can undesirably cause drag lines to be formed in the web 12.

The first and second baffles 30, 34 equalize air flow in the primary chamber 20 over the width thereof and help prevent the formation of flow disturbances which would undesirably affect the pinning of the web 12 to the cooling roll 16. Also, the baffle 34 acts as a gutter to collect material that may condense in the primary chamber 20.

The secondary vacuum chamber 22 is located adjacent the primary vacuum chamber 20 and remote from the line of contact 24 between the web 12 and the roll 16 relative to the primary vacuum chamber 20. Referring also to FIG. 7, the secondary vacuum chamber 22 is formed by a horizontal portion 42 and a vertical portion 44 of the second baffle 34, a blade housing member 46 connected to the second baffle 34 and a baffle 48 having an outer wall portion 50 and an apertured portion 52 wherein the latter includes flange 54 secured within a slot-shaped recess 56 formed in an end of the blade housing member 46. The secondary vacuum chamber 22 is further bounded by the internal vacuum blade 33 and an adjustable external vacuum blade 58 disposed in an adjusting carrier 60 which is connected by a second hinge 62 to the baffle 48. As seen in FIGS. 5 and 6, the secondary chamber 22 also includes a series of secondary exhaust ports 64 connected to a secondary vacuum source 66. The secondary vacuum source 66 is preferably, although not necessarily, independent from the primary vacuum source 40. Also preferably, although not necessarily, the primary vacuum source 40 maintains the primary chamber 20 at lower pressure than is maintained in the secondary chamber 22 by the secondary vacuum source 66.

The external vacuum blade 58 can be moved within the adjusting carrier 60 either closer to or farther away from the cooling roll 16 to change the size of an external gap 68 (best seen in FIG. 6) between the bottom of the external vacuum blade 58 and the cooling roll 16. A plurality of threaded blade adjusting bolts 70 are disposed in a corresponding plurality of blade adjustment bores 71 located in the external vacuum blade 58. With specific reference to FIG. 6, each blade adjusting bolt 70 has a cylindrical head 72 and a cylindrical stop 74. Each head 72 is secured to an associated threaded shank 75 which extends through one of a series of spaced holes in an upper portion 80 of the carrier 60. Each stop 74 is placed over an associated shank 75 adjacent the head 72. A roll pin 74 is inserted into a bore in the stop 74 and an aligned bore in the shank 75 to maintain the stop 74 in position on the bolt 70 and thereby capture the bolt 70 on the upper portion 80. If necessary or desirable, the stop 74 may be secured by a set screw or other device in position on the shank 75. Each shank 75 is threaded into a threaded bore of a cylindrical insert 76 fabricated of brass or any other suitable material and placed in close fitting relationship within a cylindrical hole 77 extending partially or fully through the blade 58. Each bolt 70 has a hex recess in the head 72 which can be engaged by a T-handle hex wrench or an allen wrench.

When an adjusting bolt 70 is rotated, it remains vertically in place because of the capturing of the upper portion 80 by the head 72 and the stop 74. However, the shank 75 threads into or out of the associated insert 76 so that a portion of the external vacuum blade 58 is moved closer to or farther from the cooling roll 16 thereby changing the size of the external gap 68.

As best seen in FIGS. 5 and 6, each end seal plate 23 is attached to the vacuum box 18 by a pair of bolts 82 and a nut 84 carried by a hand knob threaded onto a stud 86 carried by a flange 88 attached to the second baffle 34. Secured to each end seal plate 23 is a roll seal 90, preferably made of teflon or other suitable material, which is attached to the end plate 23 by a pair of bolts 92 carried by the seal plate 23 and circular nuts and washers 94. The roll seals 90 either extend over the sides of the cooling roll 16 or terminate in close proximity to the roll face. The end plates 23 and the roll seals 90 act as a barrier to prevent air or other contaminants from entering the vacuum chambers 20, 22 from the sides thereof.

As the cooling roll 16 rotates, it carries a film of entrained air on its surface. The external vacuum blade 58 acts as a barrier preventing a portion of this entrained air (and any debris carried thereby) from entering the dual-chamber vacuum box 18 and interfering with the web 12. The size of the gap 68 and the level of vacuum in the secondary vacuum chamber 22 are adjusted so that the majority of the entrained air which enters the dual-chamber vacuum box 18 and any dirt or contaminants on the surface of the cooling roll 16 or carried by the entrained air are removed by the secondary vacuum chamber 22. It should be noted that the vacuum level within the secondary vacuum chamber 22 is adjusted to accomplish this function without undesirably affecting the operation of the primary vacuum chamber.

The internal vacuum blade 33 is disposed in a recess formed by the vertical portion 44 of the second baffle 34 and the blade housing member 46. The blade 33 has a bottom surface 96 adjacent the cooling roll 16 and an internal gap 98 is defined therebetween. The air pressures in the primary and secondary chambers 20, 22 are only able to interact by way of the internal gap 98. The size and contour of the internal gap 98 define the amount of interaction that can occur between the two vacuum chambers 20, 22.

Figure 8:
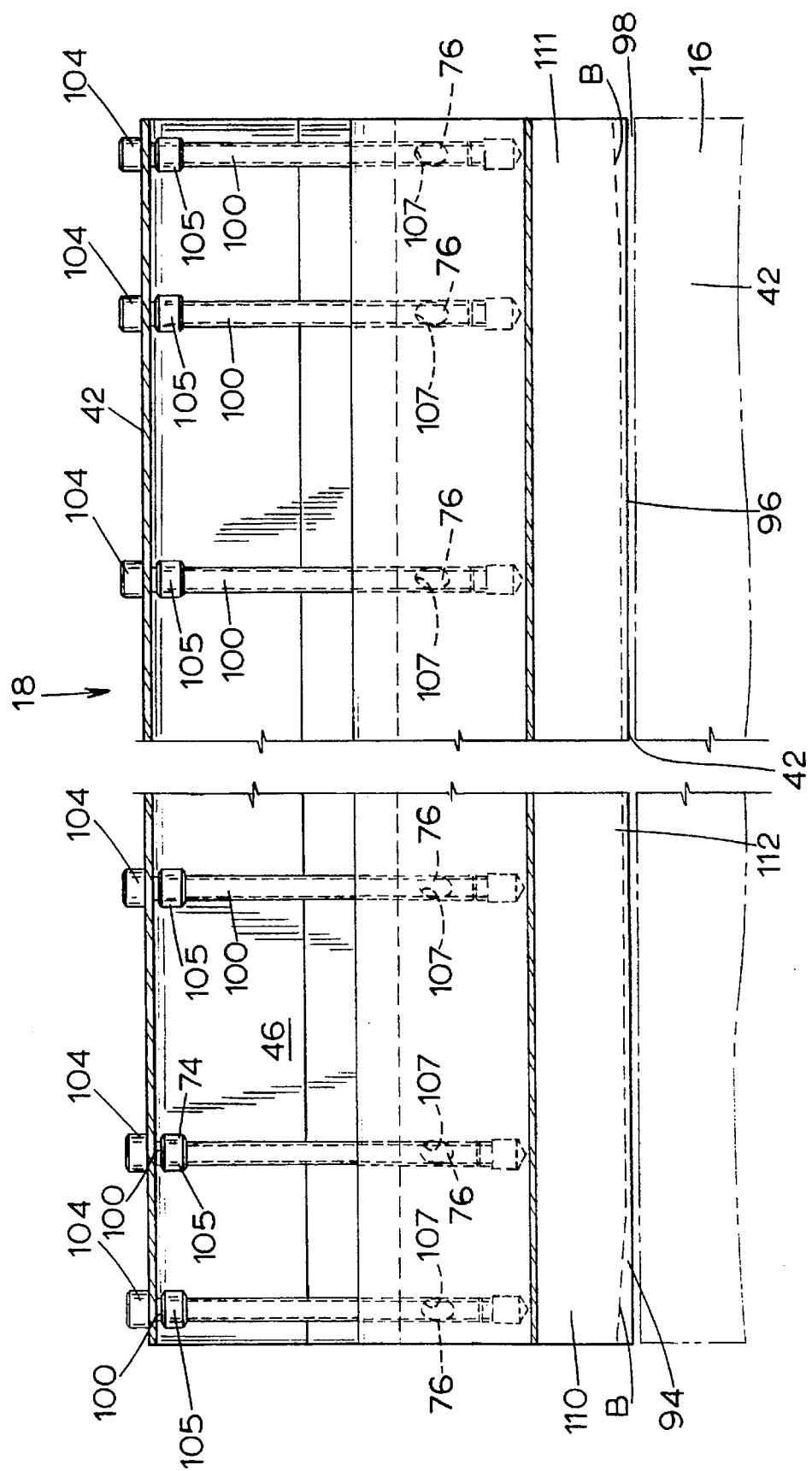
FIG. 8 is a sectional view taken generally along the lines 8—8 of FIG. 7.

The present invention is advantageously designed so that the contour of the gap 98 can be adjusted without having to disassemble the dual vacuum box 18. As best seen in FIGS. 7 and 8, each of a plurality of threaded blade adjusting bolts 99 includes a threaded shank 100 extending through associated holes 101 and 102 in the portion 42 and the blade housing member 46 and further extends into an associated bore 103 in the blade 33. A cylindrical head 104 is fixed with respect to the shank 100 and a cylindrical stop 105 is fixed onto the shank 100 by a roll pin 106, as seen in FIG. 7, so that the portion 42 is captured between the head 104 and the stop 105. Each shank 100 is threaded into a threaded bore of an associated cylindrical insert 76 placed in close fitting relationship within a cylindrical hole 107 extending partially or fully through the blade 33. The inserts 76 are identical to those used in the external blade 58. Access apertures 108, each covered by an associated rotatable cover C, are disposed on the top wall 28 of the primary vacuum chamber 20. To adjust the contour of the gap 98, each adjusting bolt 99 may be individually rotated by a hex wrench 109, as seen in FIG. 6, which extends through a respective access aperture 108. To maintain the correct vacuum pressure in the primary vacuum chamber 20, the access apertures 108 are covered by the covers C when no adjustment is being effected.

As with the external blade 58, when an adjusting bolt 99 is rotated, it remains vertically in place because of the capturing of the horizontal portion 42 by the head 104 and the stop 105. However, a portion of the vacuum blade 33 is moved closer to or farther from the roll 16 when an adjusting bolt 99 is rotated owing to the threading of the shank 100 in the insert 76. If desired, the adjusting screws 99 can be adjusted so that the bottom surface 96 of the vacuum blade 33 and the roll 16 define a gap 98 that is generally rectangular. However, it is preferable that the blade 33 be somewhat flexible and that the bolts 99 be adjusted so that the gap 98 is not generally rectangular. More specifically, as seen in FIG. 8, it is preferred that the distance between the bottom surface 96 of the vacuum blade 33 and the roll 16 be greater at edge portions 110, 111, of the vacuum blade 33 than at a central portion 112, so that the vacuum blade 33 is bowed and the contour of the gap 98 resembles a smile, as seen by the dashed line B.

Since the vacuum blade 33 is of one-piece construction and since no portion of the vacuum blade 33 therefore can move independently from the remainder of the vacuum blade 33, a greater density of blade adjustment screws 99 and bores 103 (i.e., a shorter distance between adjacent screws 99 and adjacent bores 103) is required in the proximity of the edge portions 110, 111 of the vacuum blade 33 than in the central portion 112.

In addition, the one-piece vacuum blade 33 is preferably made of a strong but flexible material so that it can be bowed or otherwise shaped without breaking. Preferably, although not necessarily, the vacuum blade 33 is fabricated of polyethylene or teflon or any other suitable material.

The bowing of the vacuum blade 33 allows varying amounts of vacuum pressure to be applied to the web 12 along the line of contact 24 between the web 12 and the roll 16. Since the gap 98 is wider at the longitudinal edges 110, 111 of the vacuum blade 33, it is believed that the vacuum pressure exerted by primary chamber 20 is lost to a greater extent at those areas and a lesser vacuum pressure is applied at those areas than at the central portion 112 of the vacuum blade 33.

It is also believed that while the vacuum applied by the primary vacuum source 40 is needed to minimize neck-in and edge bead, a slightly lesser vacuum pressure must be exerted on the longitudinal edges of the web 12 to prevent the longitudinal edges of the web 12 from fluttering when they contact the cooling roll 16.

The contour of the gap 98 can advantageously be adjusted to compensate for the various thermoplastic webs that can be extruded from a die. For example, when a thermoplastic web composed of a material very susceptible to instability is extruded through the die, the adjusting screws 99 near the longitudinal ends 110, 111 of the blade 33 can be rotated to increase the distance at the longitudinal ends 110, 111 between the bottom surface 96 of the vacuum blade 33 and the cooling roll 16. Alternatively, or in conjunction with the blade adjustment, the vacuum pressure in the secondary chamber 22 can be increased to obtain the correct cumulative vacuum pressure needed for pinning the edges of the web 12 to the roll 16.

Preferably, as seen in FIG. 5, each vacuum port 38 is equipped with a slidable damper 114 which can slide in and out of a slot to aid in regulating the amount of vacuum pressure exerted on the web 12 by the primary chamber 20.

The construction shown in FIGS. 5–8 allows the vacuum box 18 to be quickly and efficiently cleaned and debris or obstructions removed without the need to totally disassemble the box. The end seal plates 23 can be quickly removed from the sides of the vacuum box 18 by simply removing the bolts 82 and the nuts 84. Once the plates 23 are removed, the vacuum box interior is exposed and easily accessible for cleaning. Hinges 62 and 36 also allow the blades 33 and 58 to swing up in a clockwise direction as seen in FIG. 6 away from the roll 16 to prevent web wrap-up from damaging the components of the box 18.

More particularly, the second baffle 34, the blade housing member 46, the internal blade 33 and the baffle 48 are secured together, such as by welds, and joined to a first portion 36A of the hinge 36. The sidewall 32 is joined to a second portion 36B of the hinge 36, but is not secured to the baffle 48. Accordingly, once the blade 58 has been rotated in the clockwise direction, for example, either manually or by material wrapped up on the roll 16, the baffles 34 and 48, the blade housing member 46 and the internal blade 33 can also be rotated in the clockwise direction.

First and second sets of springs 118, 120 maintain the blades 33, 58 in the proper positions during operation of the vacuum box 18. Each first spring 118 is attached between a spring anchor 122 on the carrier 60 and a spring anchor 124 on the outer wall portion 50 of the baffle 48. The tension exerted by the first set of springs 118 causes the carrier 60 to rest against the baffle 48 and maintain the external blade 58 in proper position. Each second spring 120 is attached between one of the spring anchors 124 and a spring anchor 126 attached to the side wall 32. The tension exerted by the second set of springs 120 maintains the internal blade 33 in proper position.

Apparatus is also provided to partially disassemble the vacuum box 18 to permit easy cleaning of the internal components thereof. Referring to FIG. 5, a plurality of swing bolts 132 are retained in a flange 134 of the top wall 28 by nuts 136. Each swing bolt 132 includes a head pivotally retained in an anchor 138 carried on and secured to a flange 140 of the side wall 32. A plurality of bolts coupled to hand knobs 142 extend through the side wall 32 and a vertical extension 143 of the top wall 28 and are threaded into nuts (not shown) welded onto a back surface 144 of the vertical extension 143. When the hand knobs 142 and bolts are loosened and removed from the nuts, the side wall 32, and the blades 33 and 58 and other structures, can be pivoted in a counterclockwise direction as seen in FIGS. 5 and 6, so that access to the internal components is provided.

Figure 9:
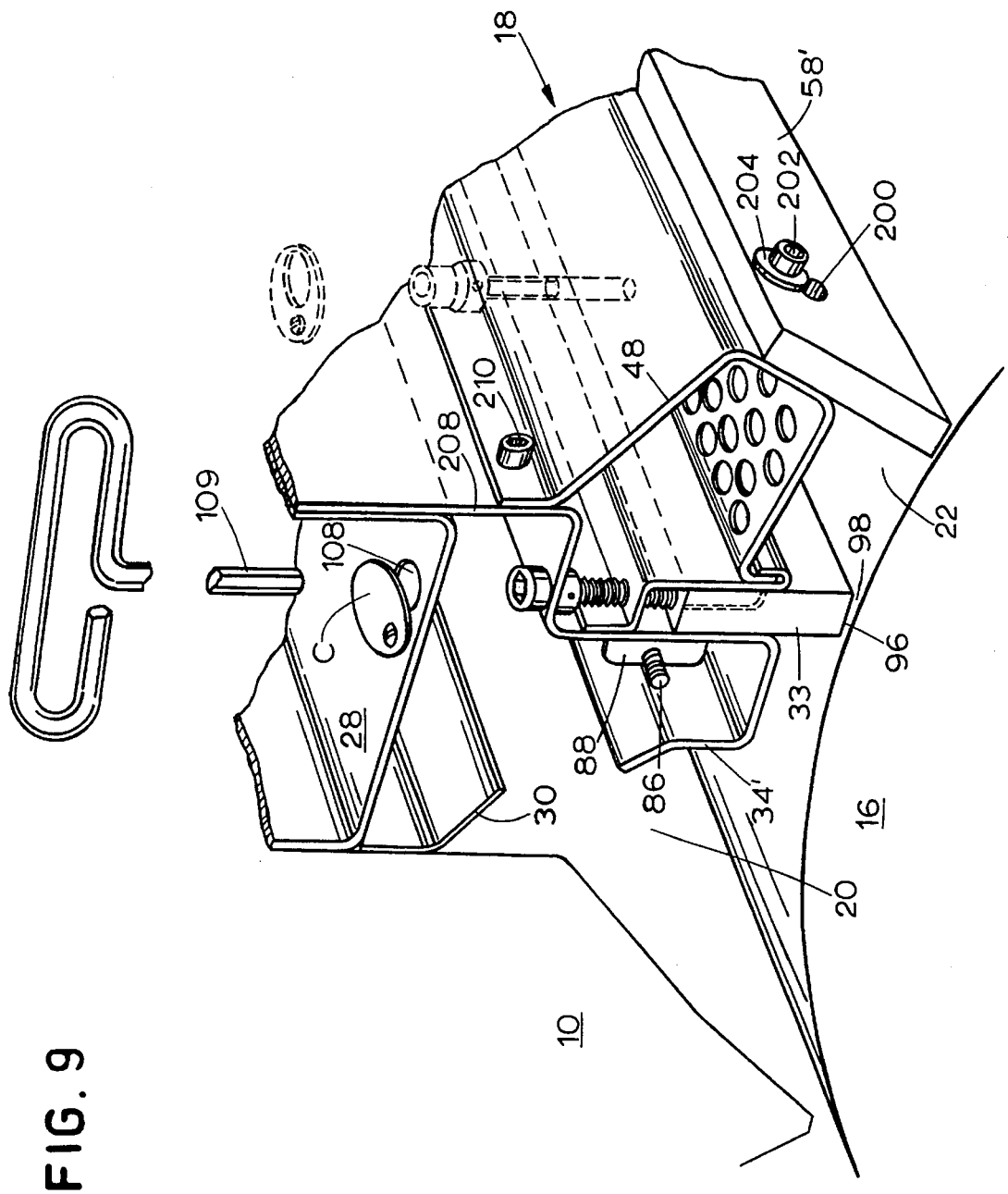
FIG. 9 is a view similar to FIG. 6 illustrating a first alternative embodiment of the present invention.

It should be noted that the hinges 36, 62 and springs 118, 120 are not necessary for proper operation of the vacuum box 18. FIG. 9 shows a dual vacuum box 18' according to a further embodiment without springs or hinges wherein elements in common with the embodiment of FIGS. 5–8 are assigned like reference numerals. The vacuum box 18' includes an external vacuum blade 58' which is directly mounted to the secondary vacuum chamber 22. Each of a plurality of mounting bolts 202 extends through a washer 204 and a respective elongate slot 200 in the external vacuum blade 58' into a threaded hole (not shown) in the carrier 48. Alternatively, the holes in the carrier 48 may be larger than the diameter of the bolts 202 and nuts may be welded onto the back surface of the carrier 48 and threaded to accept the bolts 202. The elongate slots 200 permit the blade 58' to be moved closer to or farther away from the roll 16 to create an adjustably-sized external gap 206 between the bottom of the external vacuum blade 58' and the cooling roll 16. Once the position of the blade 58' has been adjusted, the bolts 202 may be tightened to secure the blade 58' in place.

Also, the second baffle 34' of this embodiment includes a vertical portion 208 which replaces the side wall 32 of the embodiment of FIGS. 5–8. Still, further, the apertured baffle 48 is connected by a plurality of mounting bolts or screws 210 or otherwise to the vertical portion 208 of the second baffle 34'.

Figure 10:
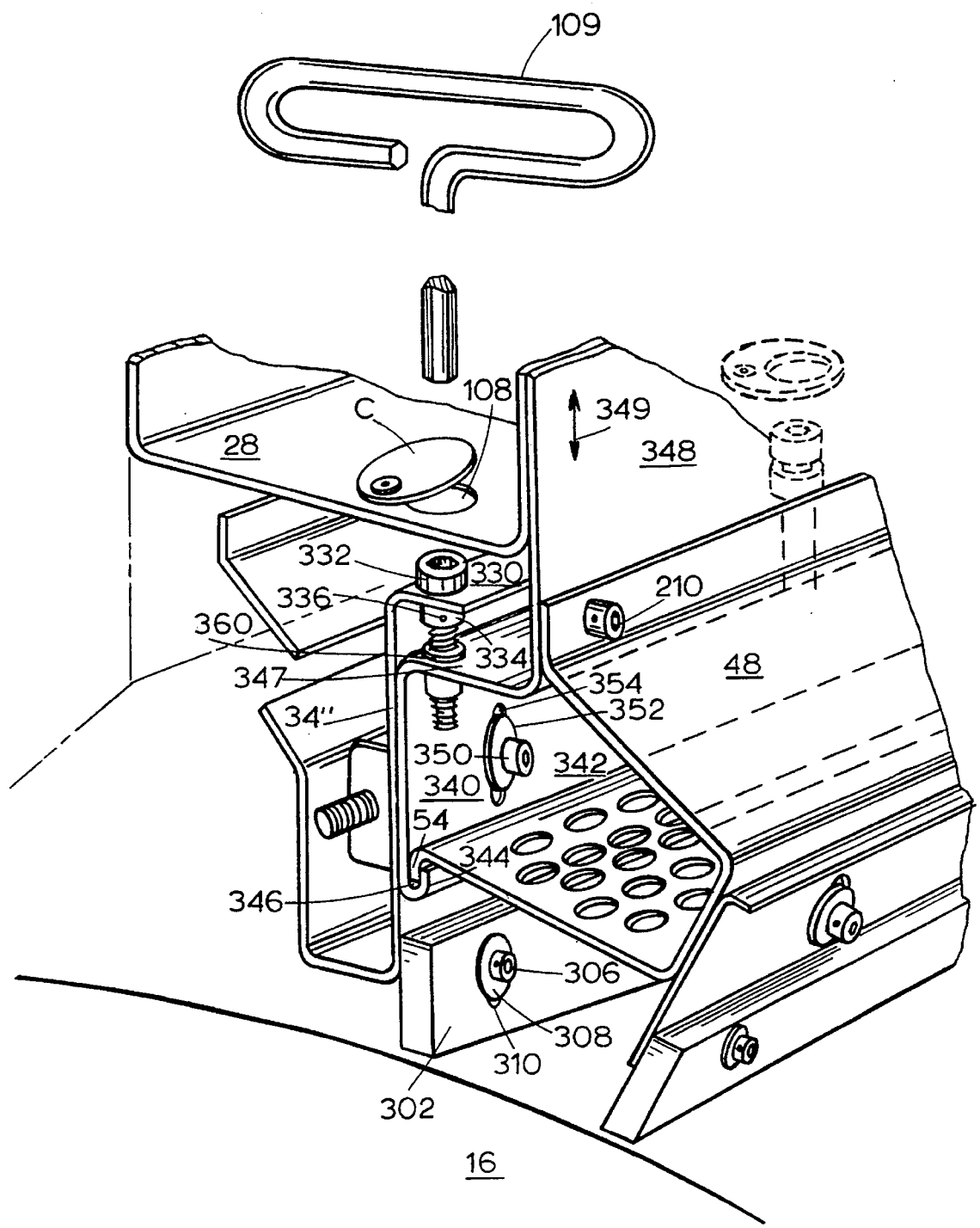
FIG. 10 is a view similar to FIGS. 6 and 9 illustrating a second alternative embodiment of the present invention.
Figure 10:
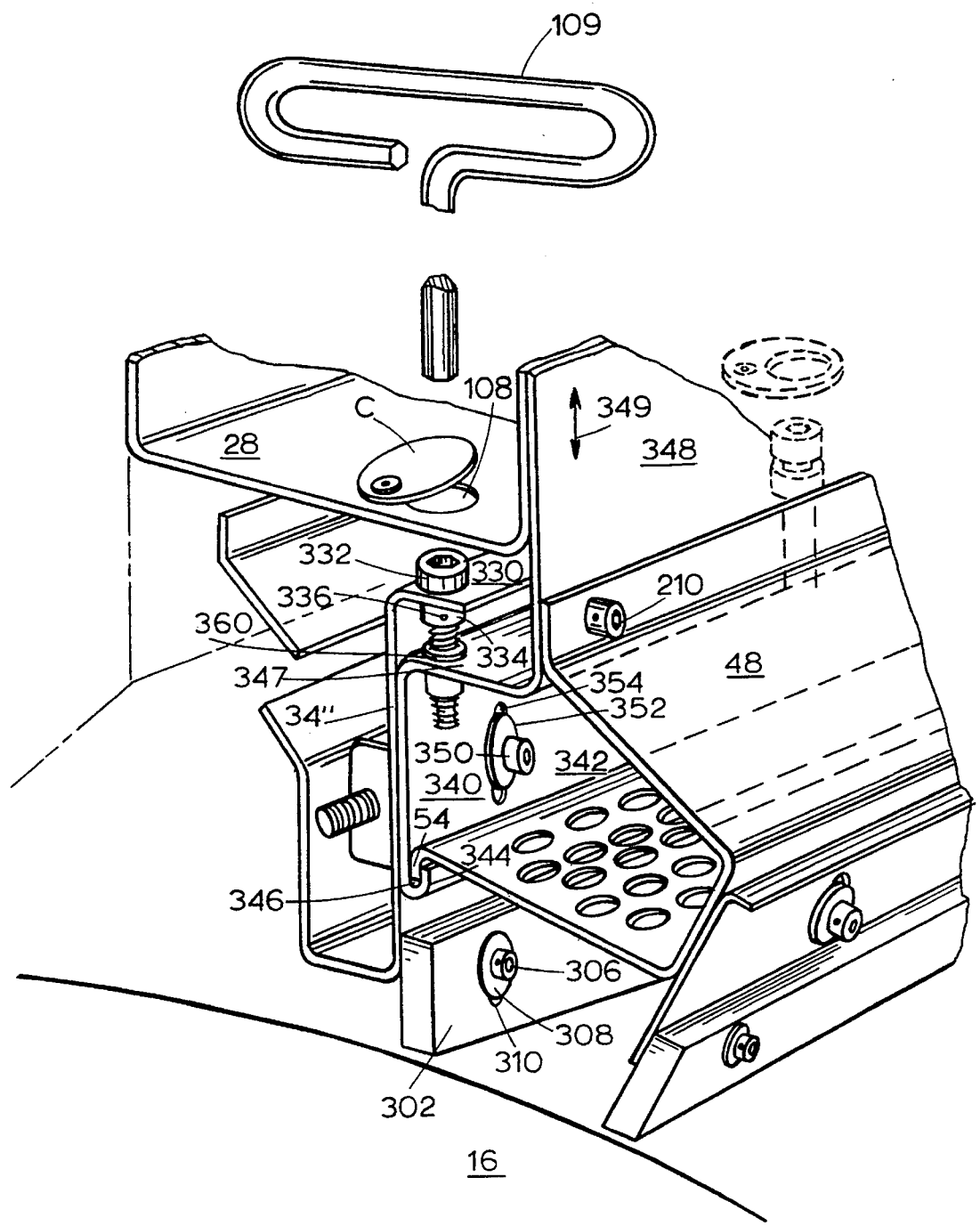

FIGS. 10 and 11 depict a third embodiment of the present invention. Again, items common to FIGS. 5–11 are assigned like reference numerals. A dual-vacuum box 18" according to this embodiment includes a multi-piece internal blade having a middle section 300 and end sections 302, 304. The middle and end sections 300–304 are joined to a baffle 34" by means of bolts 306 which extend through washers 308 and elongate slots 310 in the members 300–304 into respective holes (not shown) in the baffle 34". As before, the holes in the baffle 34' may be threaded to accept the bolts 306 or the holes may be slightly larger than the diameter of the bolts and a nut may be threaded onto the end of each bolt 306 to secure the sections 300–304 to the baffle 34". The up-and-down positioning of the sections 300–304 may be adjusted by loosening the bolts 306 and displacing the sections 300–304 in a desired direction and thereafter tightening the bolts 306.

In the embodiment illustrated in FIG. 11, the middle section 300 includes a flat bottom surface 320 whereas the end sections 302, 304 include tapered bottom surfaces 322, 324, respectively. Also in the illustrated embodiment, each bottom surface 322, 324 tapers approximately 0.062 inches from one end to the other, although this amount may be varied as needed or desired. In fact, each bottom surface 320, 322 and 324 may have any different profile including a curved and/or nontapered profile, as desired. Also, one or more of the blade section 300–304 may be removed and replaced by a different blade section as needed.

The baffle 34" and the blade sections 300–304 may be moved upwardly or downwardly as a unit. The baffle 34" includes a horizontal flange 330 having a plurality of apertures therein. A series of threaded bolts 332 extend through the apertures in the carrier 330 and a stop 334 is placed over the shank of each bolt 332. A roll pin 336 is inserted into a bore in the stop 334 to maintain the stop 334 at a desired position.

A support member 340 includes a main portion 342, a curved flange 344 forming a recess 346 which accepts the flange 54 of the baffle 48, a horizontal portion 347 and a vertical portion 348 which is secured by bolts (not shown) to the top wall 28. These bolts can be loosened and the vertical portion 348 and components supported thereby can be moved up or down in the direction of the arrow 349, as desired. The baffle 48 is secured by the bolts 210 to the vertical portion 348. The main portion 342 is secured by a plurality of bolts 350 each of which extends through a washer 352 and an elongate slot 354 into a hole (not shown) in the baffle 34". The hole in the baffle 34" may be threaded to accept the bolt 350 or the hole may be slightly larger than the bolt and a nut may be threaded onto the end of the bolt 350. The bolts 350 are tightened to secure the main portion 342 to the baffle 34" but are slightly loose to permit adjustment of the position of the baffle 34" up or down without the need to further loosen the bolts 350.

The shank of each bolt 332 extends through a threaded collar 360 received and retained within in a hole extending through the horizontal portion 347 of the member 340. When the overall height of the baffle 34" and the blade members 300–304 is to be adjusted, the bolts 332 may be rotated by the hex wrench 109 to move the carrier 34' up or down relative to the member 340.

The vacuum pressure exerted on a web along the length of the line of contact with a roll may be varied by other apparatus not shown. For example, the internal vacuum blade could have a series of apertures adjacent the bottom of each longitudinal edge portion of the vacuum blade which pass through the blade and interconnect the primary and secondary chambers. The apertures may be larger and/or may be greater in number adjacent the edge portions than at the central portion so that vacuum pressure varies along the line of contact. In this case, the bottom of the internal vacuum blade may comprise a flat surface or may have a different surface profile.

Numerous modifications and alternative embodiments of the invention will be apparent to those skilled in the art in view of the following description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A dual-chamber vacuum box for pinning a thermoplastic web to a cooling roll, comprising:

a primary vacuum chamber connected to a first vacuum source and having a first side located proximate a surface of the web at a line of contact between the web and the cooling roll and a second side opposite the first side;

a secondary vacuum chamber connected to a second vacuum source and positioned adjacent the second side of the primary vacuum chamber; and means disposed between the primary and secondary vacuum chambers including a flexible blade which is deformable while the blade is in place between the primary and secondary vacuum chambers to create a non-rectangular gap with respect to the cooling roll for adjustably creating a pressure variation along the line of contact between the web and the cooling roll.

2. The dual-chamber vacuum box of claim 1, wherein the creating means comprises a partition disposed between the primary and the secondary vacuum chambers wherein the partition permits varying interaction between the primary and secondary vacuum chambers.

3. The dual-chamber vacuum box of claim 2, wherein the partition includes a surface proximate the cooling roll and end portions disposed an opposite sides of a center portion and wherein the surface of the partition is closer to the cooling roll at the center portion than at the end portions.

4. The dual-chamber vacuum box of claim 2, wherein the creating means further comprises means connected to the partition for adjusting a distance between the partition and the cooling roll.

5. The dual-chamber vacuum box of claim 4, wherein the adjusting means comprises a plurality of threaded inserts disposed in the partition and a plurality of screws threaded into the inserts.

6. The dual-chamber vacuum box of claim 1, wherein the creating means is movably mounted between the primary and secondary vacuum chambers.

7. The dual-chamber vacuum box of claim 1, wherein the flexible blade is hingedly mounted between the primary and secondary vacuum chambers.

8. The dual-chamber vacuum box of claim 1, further including an external blade carried by the secondary vacuum chamber.

9. The dual-chamber vacuum box of claim 8, wherein the external blade is hingedly connected to the secondary vacuum chamber.

10. A dual-chamber vacuum box for pinning a thermoplastic web to a cooling roll, comprising:

a primary vacuum chamber connected to a first vacuum source and having a first side located proximate a surface of the web at a line of contact between the web and the cooling roll and a second side opposite the first side;

a secondary vacuum chamber connected to a second vacuum source and positioned adjacent the second side of the primary vacuum chamber;

means disposed between the primary and secondary vacuum chambers including a flexible blade deformable while the blade is in place between the primary and secondary vacuum chambers to create a nonrectangular gap with respect to the cooling roll for adjustably creating a pressure variation along the line of contact between the web and the cooling roll; and a member carried on an end portion of the secondary vacuum chamber wherein the creating means and member are hinged to prevent damage thereto in the event of a web wrap-up condition.

11. The dual-chamber vacuum box of claim 10, wherein the creating means comprises a partition disposed between the primary and the secondary vacuum chambers wherein the partition permits varying interaction between the primary and second vacuum chambers.

12. The dual-chamber vacuum box of claim 11, wherein the partition includes a surface proximate the cooling roll and end portions disposed an opposite sides of a center portion and wherein the surface of the partition is closer to the cooling roll at the center portion than at the end portions.

13. The dual-chamber vacuum box of claim 11, wherein the creating means further comprises means connected to the partition for adjusting a distance between the partition and the cooling roll.

14. The dual-chamber vacuum box of claim 13, wherein the adjusting means comprises a plurality of threaded inserts disposed in the partition and a plurality of screws threaded into the inserts.

15. The dual-chamber vacuum box of claim 10, wherein the creating means is movably mounted between the primary and secondary vacuum chambers.

16. The dual-chamber vacuum box of claim 10, wherein the member comprises an external blade.

17. The dual-chamber vacuum box of claim 10, further including springs coupled to the member and to the vacuum chambers for biasing the member and the creating means toward operative positions.

18. A dual-chamber vacuum box for pinning a thermoplastic web to a cooling roll, comprising:

a primary vacuum chamber having a first side located proximate a surface of the web at a line of contact between the web and the cooling roll and a second side opposite the first side;

a secondary vacuum chamber adjacent the second side of the primary vacuum chamber; and means disposed between the primary and secondary vacuum chambers including a flexible blade which is deformable while in position between the primary and secondary chambers to create a non-rectangular gap with respect to the cooling roll for adjustably creating a pressure variation along the line of contact between the web and the cooling roll.

19. The dual-chamber vacuum box of claim 18, wherein the creating means includes means for deforming the blade.

20. The dual-chamber vacuum box of claim 19, wherein the deforming means comprises a plurality of threaded inserts disposed in the blade and a plurality of screws threaded into the inserts.

21. The dual-chamber vacuum box of claim 18, wherein the flexible blade is hingedly mounted between the primary and secondary vacuum chambers.

22. The dual-chamber vacuum box of claim 18, further including an external blade carried by the secondary vacuum chamber.

23. The dual-chamber vacuum box of claim 18, further including a vacuum source coupled to at least one of the primary and secondary vacuum chambers.

* * * * *